United States Patent

Siddall

[15] 3,700,694

[45] Oct. 24, 1972

[54] INSECT CONTROL

[72] Inventor: John B. Siddall, Palo Alto, Calif.

[73] Assignee: Zoecon Corporation, Palo Alto, Calif.

[22] Filed: June 14, 1971

[21] Appl. No.: 153,073

Related U.S. Application Data

[63] Continuation-in-part of Ser. No. 860,086, Sept. 22, 1969, abandoned.

[52] U.S. Cl. .........260/343.6, 260/345.7, 260/345.8, 260/345.9, 260/347.3, 260/347.4, 260/347.8, 260/484 R, 260/535 R, 424/279

[51] Int. Cl. ................................................C07d 5/06

[58] Field of Search....................................260/343.6

[56] References Cited

UNITED STATES PATENTS 3,530,149    9/1970    Twain....................260/343.6

*Primary Examiner*—Alex Mazel
*Assistant Examiner*—Anne Marie T. Tighe
*Attorney*—Donald W. Erickson

[57] ABSTRACT

Methods of employing and compositions comprising alkylated lactones for the control of insects.

15 Claims, No Drawings

INSECT CONTROL

This is a continuation-in-part of U.S. Ser. No. 860,086, filed Sept. 22, 1969 now abandoned.

This invention relates to methods and compositions for the control of insects. More particularly, the present invention relates to methods and compositions for the control of insects and novel alkylated lactones of formula A:

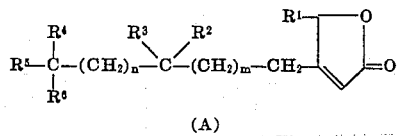

(A)

wherein, m is zero or the positive integer one to five;

n is the positive integer two to six;

each of $R^1$, $R^2$ and $R^6$ is hydrogen or lower alkyl;

each of $R^3$, $R^4$ and $R^5$ is lower alkyl

The term "lower alkyl," as used herein, refers to a saturated aliphatic hydrocarbon group of a chain length of one to six carbon atoms such as methyl, ethyl, n-propyl, n-pentyl, n-hexyl and 2-methylhexyl.

The present invention provides a novel method for the control of insects which comprises treating the insects with an effective amount of a compound of formula A. To aid in achieving uniform and economical application, it is advantageous to employ a composition comprising an inert carrier and a compound of formula A. These compositions can be either liquid or solid. The exact formulation employed will vary according to factors such as the specie of insect to be treated, the stage of the insect's life at time of treatment, the degree or extent of insect infestation, environmental conditions and type of application. The most advantageous formulation (composition) for the control of a specific insect is determinable by those of ordinary skill in the art by routine experimentation giving due consideration to the foregoing factors and the description herein.

The formulation employed is also dependent upon the primary mode or mechanism of treating the insects — that is, topical application (absorption), per oral application), per oral application (ingestion), chermosterilant (sterility) or vaporization (inhalation). The primary mode of treating insects is, in turn, dependent on whether the insect is a chewing insect, a sucking insect or flying insect, whether the control of the insect is sought at the embryo, larvae, pupae or adult stage, and the locus of the insect.

Formulations can be prepared by incorporating a compound of formula A with a solid inert carrier, such as finely divided talc, silica, pyrophyllite or clay or grandular inert carriers, such as the vermiculities or a liquid inert carrier, such acetone, xylene, peanut oil, cottonseed oil, sesame oil and other vegetable and mineral oils conventionally employed as carriers in formulations for insect control. Other components can be included such as emulsifying agents, wetting agents and dispersing agents. Generally, the formulation will contain less than 95 percent by weight of the compound and more frequentyl less than 25 percent. Depending upon the particular insect being treated and the particular state of the life cycle at the time of treatment, control of insects by treating the insects with a compound of formula A is accomplished by the compound's ability to: inhibit metamorphosis; act as a direct insecticide, particularly at the embryo state; act as a chemosterilant; or break the diapause of the insect.

Treatment of insects by vapor action can be accomplished for formulating a compound of formula A with a resinous material, such as the vinyl polymers, e.g., polyvinyl chloride. This method is particularly useful for flying insects and treating enclosed areas. Suitable formulating methods and carriers are described in U.S. Pat. No. 3,318,769, for example.

Although not intending to be limited by a theoretical explanation, it appears that the effectiveness of the compounds of formula A can be traced to their ability to mimic the activity of juvenile hormone substances. Juvenile hormone was identified as methyl 10,11-oxido-7-ethyl-3,11-trimethyltrideca-2,6-dienoate using an extract of cecropia moths by Roeller et al., Angew.Chem.internat. Edit. 6, 179 (1967) and Chemical & Engineering News, 48–49 (Apr. 10, 1967). A second juvenile hormone from the same source has been identified as methyl 10,11-oxido-3,7,11-trimethyltrideca-2,6-dienoate by Meyer et al., "The Two Juvenile Hormones from the Cecropia Silk Moth," Zoology (Proc. N.A.S.) 60 853 (1968). In addition to the natural juvenile hormones, some synthetic terpenoids have been reported exhibiting maturation inhibiting, sterility or ovicidal activity. Bowers et al., Life Sciences (Oxford 4, 2323 (1965); BioScience 18, No. 8, 791 (Aug., 1968); Williams, Scientific American 217, No. 1, 13 (July, 1967); Science 154, 248 October 14, 1966); Romanuk et al., Proc. Nat. Acad. Sci. 57, 349 (1967); Masner et al., Nature 219, 395 (July 27, 1968); and U.S. Pat. Nos. 3,429,970 and 3,453,362.

Typical insects which can be controlled by treatment with a compound of formula A in accordance with the present invention as Dysdercus cingulatus, Tenebrio molitor, Galleria mellonella, Tribolium confusm, Periplaneta americana, Hypera puctata (clover leaf weevil), Dysdercus suturellus, Aphididae, such as melon aphid and cabbage aphid, Tinea pellionella, Sitophilus granarius, Lygus hesperus, Schistocerca vaga, Phthorimoea operculella and Aedes aegypti. Generally, a dosage of about 0.1 to 25 micrograms per insect is employed.

The compounds of formula A can be prepared according to the following outlined procedures.

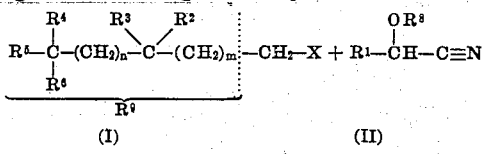

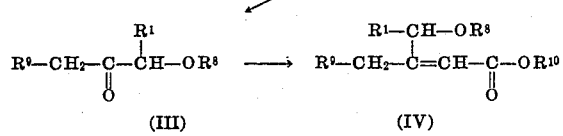

In the above formulas, $R^8$ is an acid labile group such as tetrahydropyran-2-yl or tetrahydrofuran-2-yl, $R^{10}$ is lower alkyl, X is bromo or chloro and each of $R^1$, $R^2$, $R^3$, $R^4$, $R^5$, $R^6$, $R^7$, m and n is as defined hereinabove.

In the practice of the above process, the halide I is first converted into the corresponding Grignard in the usual manner by reaction with magnesium in an organic solvent such as ether, tetrahydrofuran, ether/hydrocarbon mixture, hexamethylphosphoramide, and the like and then reacted with the nitrile II in an organic solvent inert to the reaction which can be accomplished by adding the nitrile II to the Grignard of I to yield the ketone III. The reaction can be carried out at room temperature or higher such as at reflux. The ketone III is then reacted with a phosphonate IV' in the presence of base such as an alkali metal hydride to yield IV.

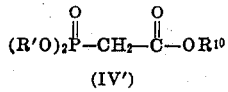
(IV')

The ester IV is saponified by treatment with base such as sodium hydroxide, potassium hydroxide, or the like in an organic solvent such as a monohydric aliphatic alcohol and then the acid cyclized by treatment with a small amount of acid such as aqueous hydrochloric acid, aqueous sulfuric acid, acqueous p-toluenesulfonic acid in an organic solvent inert to the reaction to yield a lactone of formula A.

The halides of formula I in which $R^6$ is lower alkyl are prepared according to the procedures described in my application, Ser. No. 854,778, filed Sept. 2, 1969 now U.S. Pat. No. 3,649,590, the disclosure of which is hereby incorporated by reference.

The nitriles of formula II are prepared by the reaction of an aldehyde $R^1$—CHO with sodium cyanide in the presence of aqueous acid to yield $R^1$—CHOH-C≡N which is etherified in the usual manner to yield II.

The following examples set forth procedures for the preparation of the compounds of this invention and illustrate the present invention. Temperature in degrees Centigrade.

EXAMPLE 1

A. 2 g. of 1-bromo-4-ethyl-4,7,7-trimethyloctane is added to 3 g. of magnesium in 25 ml. of ether. After the initial reaction, a solution of 24 g. of 1-bromo-4-ethyl-4,7,7-trimethy-loctane in 100 ml. of ether is added while maintaining reflux.

The above prepared Grignard reagent is cooled in an ice bath and 13 g. of 2-(tetrahydropyran-2'-yloxy)-propionitrile is added slowly, under nitrogen, while maintaining reflux. The solution is then refluxed for one hour after completion of the addition, cooled, and a small amount of dilute aqueous sulfuric acid is added with swirling. The mixture is washed with water and the aqueous phase extracted with ether. The organic materials and ether extract are combined and washed with dilute aqueous hydrochloric acid until the washings are just acidic. The organic phase is dried over magnesium sulfate and evaporated under reduced pressure to give 2-(tetrahydropyran-2'-yloxy)-7-ethyl-7,10,10-trimethylundecan-3-one which can be purified by distillation or chromatography.

B. To a mixture of 2.4 g. of sodium hydride in 100 ml. of tetrahydrofuran is added 22 g. of diethylcarbomethoxy-methylphosphonate in 100 ml. of tetrahydrofuran under nitrogen. The mixture is stirred until the evolution of gas ceases and 30 g. of 2-(tetrahydropyran-2'-yloxy)-7-ethyl-7,10,10-trimethyl-undecan-3-one is then slowly added with stirring, maintaining a temperature below 30°. The mixture is stirred for about 2 hours and then diluted with water and extracted with ether. The ethereal extracts are washed well with water, dried over sodium sulfate and evaporated to remove the solvent to yield methyl 3-[1-(1-tetra-hydropyran-2'-yloxy) ethyl]-7-ethyl-7,10,10-trimethylundec-2-enoate which can be purified by distillation or chromatography.

C. A mixture of 2 g. of the methyl ester of Part B, 100 ml. of methanol, 0.4 g. of sodium carbonate and 10 ml. of water neutralized and extracted with chloroform. The organic extracts are combined, washed with water, dried over sodium sulfate and evaporated at room temperature to yield the corresponding acid.

A mixture of 1.0 g. of the thus-obtained acid, 60 ml. of dioxane-water (2:1) and 3N aqueous hydrochloric acid (1.5 ml.) is heated at 50°-55° for 20 hours and then cooled. The mixture is diluted with water and extracted with ether. The ethereal extracts are combined, washed with water and dilute aqueous sodium bicarbonate, dried over magnesium sulfate and evaporated under reduced pressure to yield 4-hydroxy-4-methyl-3-(4'-ethyl-4',7'7',-trimethyloctan-1'-yl) crotonic acid γ-lactone which is purified by chromatography and fractional distillation.

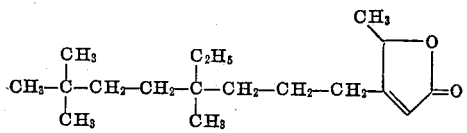

EXAMPLE 2

A. The procedure of Example 1 (Part A) is repeated using each of 1-bromo-4,4,8,8-tetramethylnonane, 1-bromo-3,3,7,7-tetramethyloctane, 1-bromo-4,4,7,7-tetramethyloctane,1-bromo-4,4,8,8-tetramethyldecane,1-bromo-4,7,7-trimethyl-4-ethylnonane, 1-bromo-4,7-dimethyl-4,7-diethylnonane,1-bromo-4,4,7,7-tetra-methylnonane, and 1-bromo-4,4,9,9-tetramethyldecane as the starting material in place of 1-bromo-4-ethyl-4,7,7-trimethyloctane to yield the respective product listed under Column I.

I 2-(tetrahydropyran-2'-yloxy)-7,7,11,11-tetramethyl-dodecan-3-one
2-(tetrahydropyran-2'-yloxy)-6,6,10,10-tetramethylundecan-3-one
2-(tetrahydropyran-2'-yloxy)-7,7,10,10-tetramethylundecan-3-one
2-(tetrahydropyran-2'-yloxy)-7,7,11,11-tetramethyl-tridecan-3-one
2-(tetrahydropyran-2'-yloxy)-7-ethyl-7,10,10-trimethyldodecan-3-one
2-(tetrahydropyran-2'-yloxy)-7,10-diethyl-7,10-dimethyldodecan-3-one
2-(tetrahydropyran-2'-yloxy)-7,7,10,10-tetramethyl-dodecan-3-one
2-(tetrahydropyran-2'-yloxy)-7,7,12,12-tetramethyl-tridecan-3-one B. Each of the ketones listed under Column I is used as the starting material in the procedure of Example I (Part B) to yield the respective product listed under Column II.

II methyl 3-[1-(1-tetrahydropyran-2'-yloxy) ethyl]-7,7,11,11-tetramethyldodec-2-enoate methyl 3-[1-(1-tetrahydropyran-2'-yloxy) ethyl]-6,6,10,10-tetramethylundec-2-enoate methyl 3-[1-(1-tetrahydropyran-2'-yloxy) ethyl]-7,7,10,10-tetramethylundec-2-enoate methyl 3-[1-(1-tetrahydropyran-2'yloxy) ethyl]-7,7,11,11-tetramethyltridec-2-enoate methyl 3-[1-(1-tetrahydropyran-2'-yloxy) ethyl]-7-ethyl-7,10,10-trimethyldodec-2-enoate methyl 3-[1-(1-tetrahydropyran-2'-yloxy) ethyl]-7,10,-diethyl-7,10-dimethyldodec-2-enoate methyl 3-[1-(1-tetrahydropyran-2'-yloxy) ethyl]-7,7,10,10-tetramethyldodec-2-enoate methyl 3-[1-(1-tetrahydropyran-2'-yloxy) ethyl] -7,7,12,12-tetremethyltridec-2-enoate C. Each of the methyl esters under Column II is used in the process of Example 1 (Part C) to yield the respective final product listed under Column III.

III 4-hydroxy-4-methyl-3-(4',4',8'8'-tetramethylnonan-1'-yl)crotonic acid γ-lactone 4-hydroxy-4-methyl-3-(3',3'7',7'-tetramethyloctan-1'-yl) crotonic acid γ-lactone 4-hydroxy-4-methyl-3-(4',4',7',7'-tetramethyloctan-1'-yl) crotonic acid γ-lactone 4-hydroxy-4-methyl-3(4',4',8',8'-tetramethyldecan-1'-yl) crotonic acid γ-lactone.

4-hydroxy-4-methyl-3-(4'-ethyl-4',7',7'-trimethyl-nonan-1'-yl) crotonic acid γ-lactone 4-hydroxy-4-methyl-3-(4',7'-diethyl-4',7'-dimethyl-nonan-1'-yl) crotonic acid γ-lactone 4-hydroxy4-methyl-3-(4',4',7',7'-tetramethylnonan-1'-yl) crotonic acid γ-lactone 4-hydroxy-4-methyl-3-(4',4',9',9'-tetramethyl-decan-1'-yl) crotonic acid γ-lactone

EXAMPLE 3

A. By repeating the process of Example 1 (Part A) using the halides listed under Column IV, the respective ketones listed under Column V are obtained.

IV 1-bromo-5,5,10,10-tetramethylundecane
1-bromo-4,7,7-trimethyloctane
1-bromo-4,8,8-trimethylnonane
1-bromo-4,7,7-trimethylnonane
1-bromo-4-ethyl-7,7-dimethylnonane
1-bromo-4,8,8-trimethyldecane
1-bromo-2,6,6-trimethylheptane

V 2-(tetrahydropyran-2'-yloxy)-8,8,13,13-tetramethyl-tetradecan-3-one 2-(tetrahydropyran-2'-yloxy)-7,10,10-trimethylun-decan-3-one 2-(tetrahydropyran-2'-yloxy)-7,11,11-trimethyl-dodecan-3-one 2-(tetrahydropyran-2'-yloxy)-7,10,10-trimethyl-dodecan-3-one 2-(tetrahydropyran-2'-yloxy)-7-ethyl-10,10-dimethyldodecan-3-one 2-(tetrahydropyran-2'-yloxy)-7,11,11-trimethyl-tridecan-3-one 2-(tetrahydropyran-2'-yloxy)-5,9,9-trimethyldecan-3-one The ketones listed under Column V are treated according to the procedure of Example 1 (Part B) to yield the methyl esters under Colunm VI which are cyclized using the procedure of Example 1 (Part C) to yield the lactones under Column VII.

VI methyl 3-[1-(1-tetrahydropyran-2'-yloxy)ethyl]-8,8,13,13-tetramethyl-tetradec-2-enoate methyl 3-[1-(1-tetrahydropyran-2'-yloxy)ethyl]-7,10,10-trimethylundec-2-enoate methyl 3-[1-(1-tetrahydropyran-2'-yloxy)ethyl]-7,11,11-trimethyldodec-2-enoate methyl 3-[1-(1-tetrahydropyran-2'-yloxy)ethyl]-7,10,10-trimethyldodec-2-enoate methyl 3-[1-(1-tetrahydropyran-2'-yloxy)ethyl]-7-ethyl-10,10-dimethyldodec-2-enoate methyl 3-[1-(1-tetrahydropyran-2'-yloxy)ethyl]-7,11,11-trimethyltridec-2-enoate methyl 3-[1-(1-tetrahydropyran-2'-yloxy)ethyl]-5,9,9-trimethyltridec-2-enoate

VII 4-hydroxy-4-methyl-3-(5',5',10',10'-tetramethylun-decan-1'-yl) crotonic acid γ-lactone 4-hydroxy-4-methyl-3-(4',7',7'-trimethyloctan-1'-yl) crotonic acid γ-lactone 4-hydroxy-4-methyl-3-(4',8',8'-trimethylnonan-1'-yl) crotonic acid γ-lactone 4-hydroxy-4-methyl-3-(4',7',7'-trimethylnonan-1' yl) crotonic acid γ-lactone 4-hydroxy-4-methyl-3-(4'-ethyl-7',7'-dimethyl-nonan-1'-yl) crotonic acid γ-lactone 4-hydroxy-4-methyl-3-(4',8',8'-trimethyldecan-1'-yl) crotonic acid γ-lactone 4-hydroxy-4-methyl-3-(2',6',6'-trimethylheptan-1'-yl) crotonic acid γ-lactone

EXAMPLE 4

Using the process of Example 1 (Part A), 2-(tetrahydropyran-2'-yloxy)-n-butyronitrile is reacted with Grignard of 1-bromo-4,4,8,8-tetramethylnonane to yield 3-(tetrahydro-pyran-2'-yloxy)-8,8,12,12-tetramethyltridecan-4-one which is reacted with diethylcarbomethosymethylphosphonate to yield methyl 3-[1-(1-tetrahydropyran-2'-yloxy)n-propyl]-7,7,11,11-tetramethyldodec-2-enoate. The methyl ester is cyclized using the procedure of Example 1 (Part C) to afford 4-hydroxy-4-ethyl-3-(4',4',8',8'-tetramethylnonan-1'-yl) crotonic acid γ-lactone.

By repeating the procedure of this Example using 2-(tetrahydropyran-2'-yloxy) acetonitrile in place of the butyronitrile, there is obtained, as the final product, 4-hydroxy-3-(4',4',8',8'-tetramethylnonan-1'-yl) crotonic acid γ-lactone.

EXAMPLE 5

Compositions according to the present invention which are suitable for spraying on the locus of the insects, preferably during egg or larvae stage, or on granular inert carriers are as follows. Parts by weight.

| | Parts |
|---|---|
| 4-hydroxy-4-methyl-3-(4'-ethyl-4',7',7'-trimethyl-octan-1'-yl)crotonic acid γ-lactone | 5 |

| | |
|---|---|
| cottonseed oil | 95 |
| 4-hydroxy-3-(4',4',8',8'-tetramethylnonan-1'-yl) crotonic acid γ-lactone | 3 |
| sesame oil | 97 |

EXAMPLE 6

A mixture of 45 g. of sodium cyanide, 110 ml. of water and 80 g. of n-butyraldehyde is stirred vigorously at 10°-20° After addition is complete, the mixture is stirred for 15 min., allowed to stand and organic layer decanted off. Aqueous layer is extracted with ether and ether extracts combined with organic layer decanted. Solvent is evaporated to yield 2-hydroxy-n-butyronitrile which is purified by distillation under reduced pressure.

A mixture of 8.5 g. of 2-hydroxy-n-butyronitrile and 8.4 g. of freshly distilled dihydropyran is stirred in the presence of a trace of hydrogen chloride for about four hours, the process of the reaction being followed by thin layer chromatography. Upon completion of the reaction, the mixture is distilled under reduced pressure in the presence of anhydrous potassium carbonate to yield 2-(tetrahydropyran-2'-yloxy)-n-buty-ronitrile.

By the foregoing procedure, other aldehydes of the formula R—CHO can be converted into the nitriles of formula II. By using dihydrofuran in place of dihydropyran in the above procedure, the corresponding tetrahydrofuran-2'-yl ethers are prepared.

EXAMPLE 7

By repeating the process of Example 1 (Part A) using the halides under Column VIII, the respective ketones under Column IX are prepared.

VIII 3,6-dimethylheptyl bromide
4,7-dimethyloctyl bromide
2,5-dimethylhexyl bromide
3,-dimethyloctyl bromide
3,-dimethylnonyl bromide
4,8-dimethylnonyl bromide
3-methyl-7-ethylnonyl bromide

IX 2-(tetrahydropyran-2'-yloxy)-6,9-dimethyldecan-3-one
2-(tetrahydropyran-2'-yloxy)-7,10-dimethylundecan-3-one
2-(tetrahydropyran-2'-yloxy)-5,8-dimethylnonan-3-one
2-(tetrahydropyran-2'-yloxy)-6,10-dimethylundecan-3-one
2-(tetrahydropyran-2'-yloxy)-6,10-dimethyldodecan-3-one
2-(tetrahydropyran-2'-yloxy)-7,11-dimethyldodecan-3-one
2-(tetrahydropyran-2'-yloxy)-6-methyl-10-ethyldodecan-3-one The ketones listed under Column IX are treated according to the procedure of Example 1 (Part B) to prepare the methyl esters under Column X which are cyclized using the procedure of Example 1 (Part C) to yield the lactones under Column XI.

X methyl 3-[1-(1-tetrahydropyran-2'-yloxy)ethyl]-6,9,dimethyldec-2-enoate
methyl 3-[1-(1-tetrahydropyran-2'-yloxy)ethyl]-7,10-dimethylundec-2-enoate
methyl 3-[1-(1-tetrahydropyran-2'-yloxy)ethyl]-5,8-dimethylnon-2-enoate
methyl 3-[1-(1-tetrahydropyran-2'-yloxy)ethyl]-6,10-dimethylundec-2-enoate
methyl 3-[1-(1-tetrahydropyran-2'-yloxy)ethyl]-6,10-dimethyldodecan-2-enoate
methyl 3-[1-(1-tetrahydropyran-2'-yloxy)ethyl]-7,11-dimethyldodecan-2-enoate
methyl 3-[1-(1-tetrahydropyran-2'-yloxy)ethyl]-6-methyl-10-ethyldodec-2-enoate

XI 4-hydroxy-4-methyl-3-(3',6'-dimethylkeptan-1'-yl) crotonic acid γ-lactone
4-hydroxy-4-methyl-3-(4',7'-dimethyloctan-1'-yl) crotonic acid γ-lactone
4-hydroxy-4-methyl-3-(2,5-dimethylhexan-1'-yl) crotonic acid γ-lactone
4-hydroxy-4-methyl-3-(3',7'-dimethyloctan-1'-yl) crotonic acid γ-lactone
4-hydroxy-4-methyl-3-(3',7'-dimethylnonan-1'-yl) crotonic acid γ-lactone
4-hydroxy-4-methyl-3-(4',8'-dimethylnonan-1'-yl) crotonic acid γ-lactone
4-hydroxy-4-methyl-3-(3'-methyl-7'-ethylnonan-1'-yl) crotonic acid γ-lactone The process of Example 1 is repeated with the exception of using 2-(tetrahydropyran-2'-yloxy) acetonitrile and 3,7-dimethyloctyl bromide to yield as the final product, 4-hydroxy-3-(3',7'-dimethyloctan-1'-yl) crotonic acid γ-lactone.

EXAMPLE 8

Following the procedure of Example 1 (B), each of the ketones under Column IX is reacted with the carbanion of diethyl-carbethoxymethylphosphonate to prepare the respective ethyl esters under Column XII:

XII ethyl 3-[1-(1-tetrahydropyran-2'-yloxy)ethyl]-6,9-dimethyldec-2-enoate
ethyl 3-[1-(1-tetrahydropyran-2'-yloxy)ethyl]-7,10-dimethylundec-2-enoate
ethyl 3-[1-(1-tetrahydropyran-2'-yloxy)ethyl]-5,8-dimethylnon-2-enoate
ethyl 3-[1-(1-tetrahydropyran-2'-yloxy)ethyl]-6,10-dimethylundec-2-enoate
ethyl 3-[1-(1-tetrahydropyran-2'-yloxy)ethyl]-6,10-dimethyldodecan-2-enoate
ethyl 3-[1-(1-tetrahydropyran-2'-yloxy)ethyl]-7,11-dimethyldodecan-2-enoate
ethyl 3-[1-(1-tetrahydropyran-2'-yloxy)ethyl-6-methyl-10-ethyldodec-2-enoate A solution of 0.1 mole of ethyl 3-[1-(1-tetrahydropyran-2'-yloxy)ethyl]-6,9-dimethyldec-2-enoate in 100 ml. of aqueous tetrahydrofuran (1:4) is treated with aqueous 1N hydrochloric acid (5 ml.) at 20° for three hours. After addition of aqueous potassium bicarbonate solution (0.5 g. in 300 ml. of water), the mixture is extracted with methylene chloride (3 x 100 ml.). The combined extracts are washed with water (300 ml.), saturated aqueous potassium bicarbonate (50 ml.) and saturated brine (100 ml.), dried over magnesium sulfate and evaporated under reduced pressure to yield ethyl 3-[1-(1-hydroxy)ethyl]-6,9-dimethyldec-2-enoate.

By use of the foregoing procedure, other compounds under Column X and XII are hydrolyzed to the respective free hydroxy compound (IV; $R^8$ is hydrogen). Free acids are prepared using the process of Example 1 (C), first paragraph.

Compounds of the formula B below, which are prepared using the procedures herein, are useful for the control of insects as described above for compounds of formula A as well as their utility as intermediates for preparing the compounds of formula A.

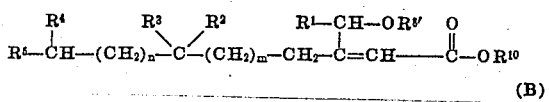

(B)

wherein, each of $m$, $n$, $R^1$, $R^2$, $R^3$, $R^4$ and $R^5$ is as defined above; $R^8$ prime is hydrogen, tetrahydropyran-2'-yl or tetrahydrofuran-2'-yl; and $R^{10}$ is hydrogen or lower alkyl.

Quaternary alkyl compounds of formula B are claimed in my application Ser. No. 874,678, filed Nov. 6, 1969 now U.S. Pat. No. 3,631,080.

Alkyl halides of formula I can be prepared using methods described in the art. For example, they can be prepared by Grignard reaction with ketones or aldehydes followed by hydrogenation of the alcohol function using phosphorus tribromide, phosphorus trichloride, and the like, by hydrogenation of the corresponding olefin precursor using palladium-on-carbon catalyst, or the like. Alkyl halides can be prepared by reduction of carbonyl precursors, such as aldehydes, ketones and esters, to the alcohol which is then halogenated.

What is claimed is:

1. A compound selected from those having the formula (A):

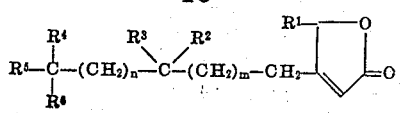

wherein,
$m$ is zero or the positive integer one to five;
$n$ is the positive integer two to six;
each of $R^1$, $R^2$ and $R^6$ is hydrogen or lower alkyl; and
each of $R^3$, $R^4$ and $R^5$ is lower alkyl.

2. A compound according to claim 1 in which $m$ is one to three and $n$ is one to four.

3. A compound according to claim 2 in which each of $R^1$, $R^2$ and $R^6$ is hydrogen, methyl or ethyl and each of $R^3$, $R^4$ and $R^5$ is methyl or ethyl.

4. A compound according to claim 1 in which $m$ is one or two and $n$ is two to four.

5. A compound according to claim 4 in which each of $R^1$, $R^2$ and $R^6$ is hydrogen, methyl or ethyl and each of $R^3$, $R^4$ and $R^5$ is methyl or ethyl.

6. A compound according to claim 5 in which $R^1$ is methyl.

7. A compound according to claim 1 wherein $R^2$ is hydrogen; $m$ is zero, one or two; and $n$ is two, three or four.

8. A compound according to claim 7 wherein $m$ is one; $n$ is three; each of $R^1$ and $R^6$ is hydrogen, methyl or ethyl; and each of $R^3$, $R^4$ and $R^5$ is methyl or ethyl.

9. A compound according to claim 8 wherein $R^6$ is hydrogen.

10. A compound according to claim 9 wherein each of $R^3$, $R^4$ and $R^5$ is methyl.

11. A compound according to claim 10 wherein $R^1$ is methyl.

12. A compound according to claim 8 wherein $m$ is one; $n$ is three; $R^2$ is hydrogen; and each of $R^3$, $R^4$, $R^5$ and $R^6$ is methyl or ethyl.

13. A compound according to claim 12 wherein each of $R^3$, $R^4$, $R^5$ and $R^6$ is methyl and $R^1$ is hydrogen or methyl.

14. A compound according to claim 13 wherein $R^1$ is methyl.

15. A compound according to claim 7 wherein $m$ is one; $n$ is two to four; $R^1$ is hydrogen or methyl; each of $R^3$, $R^4$ and $R^5$ is methyl or ethyl; and $R^6$ is hydrogen, methyl or ethyl.

* * * * *